United States Patent [19]

Medianik

[11] Patent Number: 4,881,674
[45] Date of Patent: Nov. 21, 1989

[54] FISHING ROD HOLDER

[76] Inventor: Anatoly Medianik, 46 Tone Ter., Rochester, N.Y. 14617

[21] Appl. No.: 189,949

[22] Filed: May 3, 1988

[51] Int. Cl.⁴ ............................................... B60R 7/00
[52] U.S. Cl. ..................... 224/311; 224/922; 224/326; 211/70.8; 248/228; 248/231.6
[58] Field of Search ............... 224/311, 913, 922, 325, 224/326, 309, 42.41, 42.42, 42.46 R; 248/225, 31, 228, 231.2, 231.6, 340, 341; 211/64, 68, 70.8; 296/37.7, 37.8

[56] References Cited

U.S. PATENT DOCUMENTS

| | | | |
|---|---|---|---|
| 2,554,650 | 5/1951 | Waite | 224/323 |
| 2,721,680 | 10/1955 | Stechman | 224/275 |
| 2,830,748 | 4/1958 | Faltin | 224/42.46 R |
| 3,291,427 | 12/1966 | Hutchings | 248/201 |
| 3,301,513 | 1/1967 | Sugaya | 248/228 |
| 3,524,572 | 8/1970 | Hall | 224/922 |
| 3,672,513 | 6/1972 | Riddle et al. | 224/311 |
| 4,006,825 | 2/1977 | Austin et al. | 211/64 |
| 4,424,907 | 1/1984 | Roff | 211/70.8 |
| 4,582,303 | 4/1986 | Davis | 267/64.13 |
| 4,760,986 | 8/1988 | Harrison | 248/225.31 |

Primary Examiner—Henry J. Recla
Assistant Examiner—Edward C. Donovan
Attorney, Agent, or Firm—Jerry T. Kearns

[57] ABSTRACT

A fishing rod holder for securing a plurality of fishing rods within a camper shell or cap mounted on a pickup truck includes a pair of supports. The supports are secured to cross roof braces of the camper shell in parallel spaced relation. A generally rectangular first support has a plurality of U-shaped notches for the reception of handle portions of a plurality of fishing rods. A pivotal clamp bar is mounted between pairs of adjacent notches and may be pivoted between opened and closed positions for securing a fishing rod handle within each notch. A plurality of spaced apertures are provided for the reception of threaded fasteners utilized to secure the first support to a roof cross brace of the camper shell. A generally rectangular second support has a series of spaced circular apertures for the reception of tip portions of a plurality of fishing rods. The second support has a second plurality of apertures for the reception of threaded fasteners utilized to secure the second support to a roof cross brace of a camper shell. A clamp is disclosed which utilizes a pair of serrated jaw portions for engagement with the camper shell roof cross braces for mounting the fishing rod holder without necessitating the drilling of any holes.

1 Claim, 4 Drawing Sheets

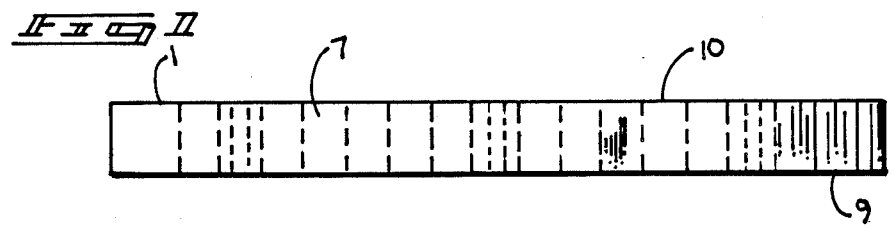
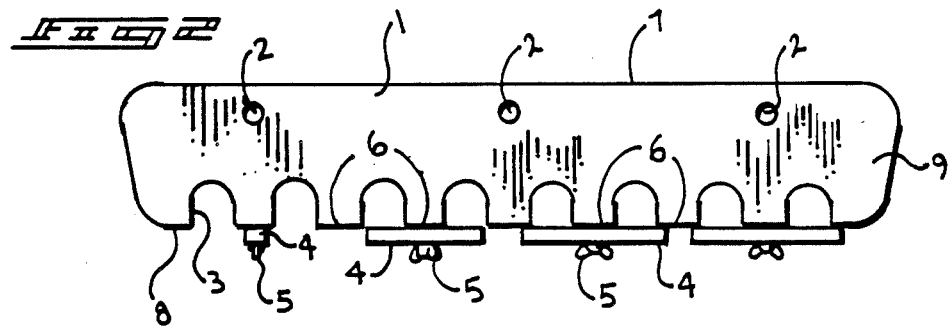
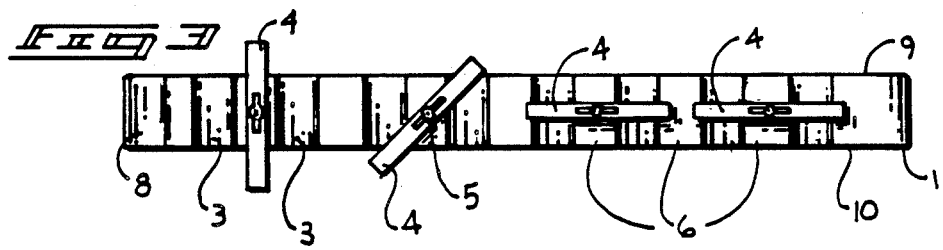
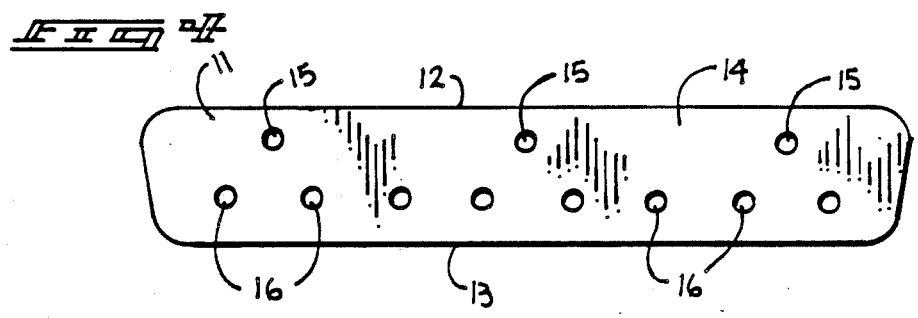
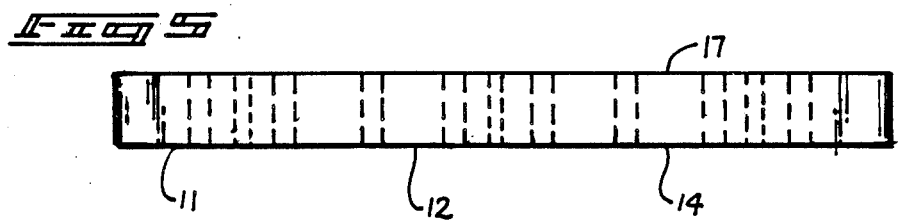

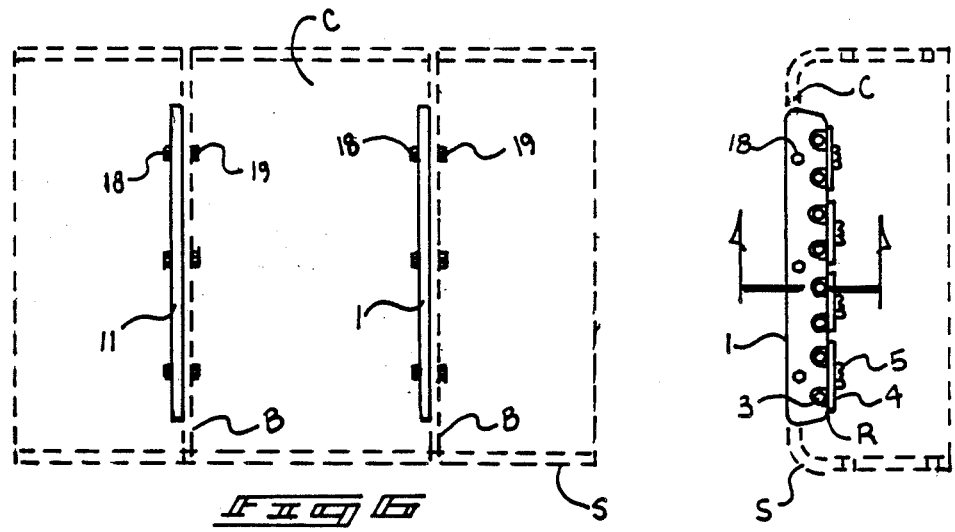
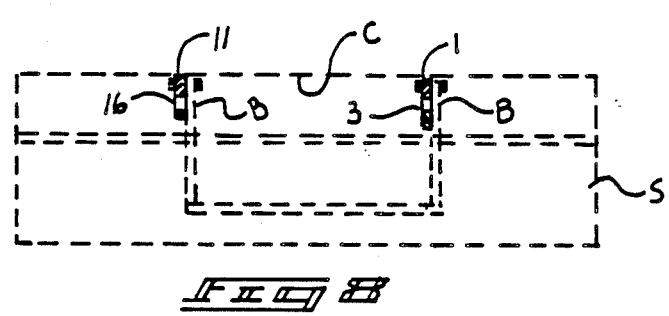
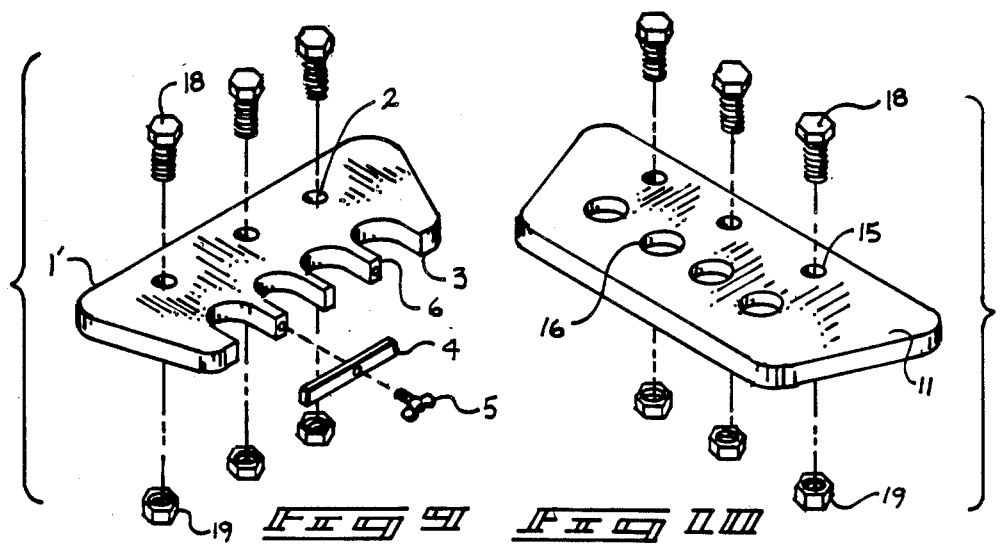

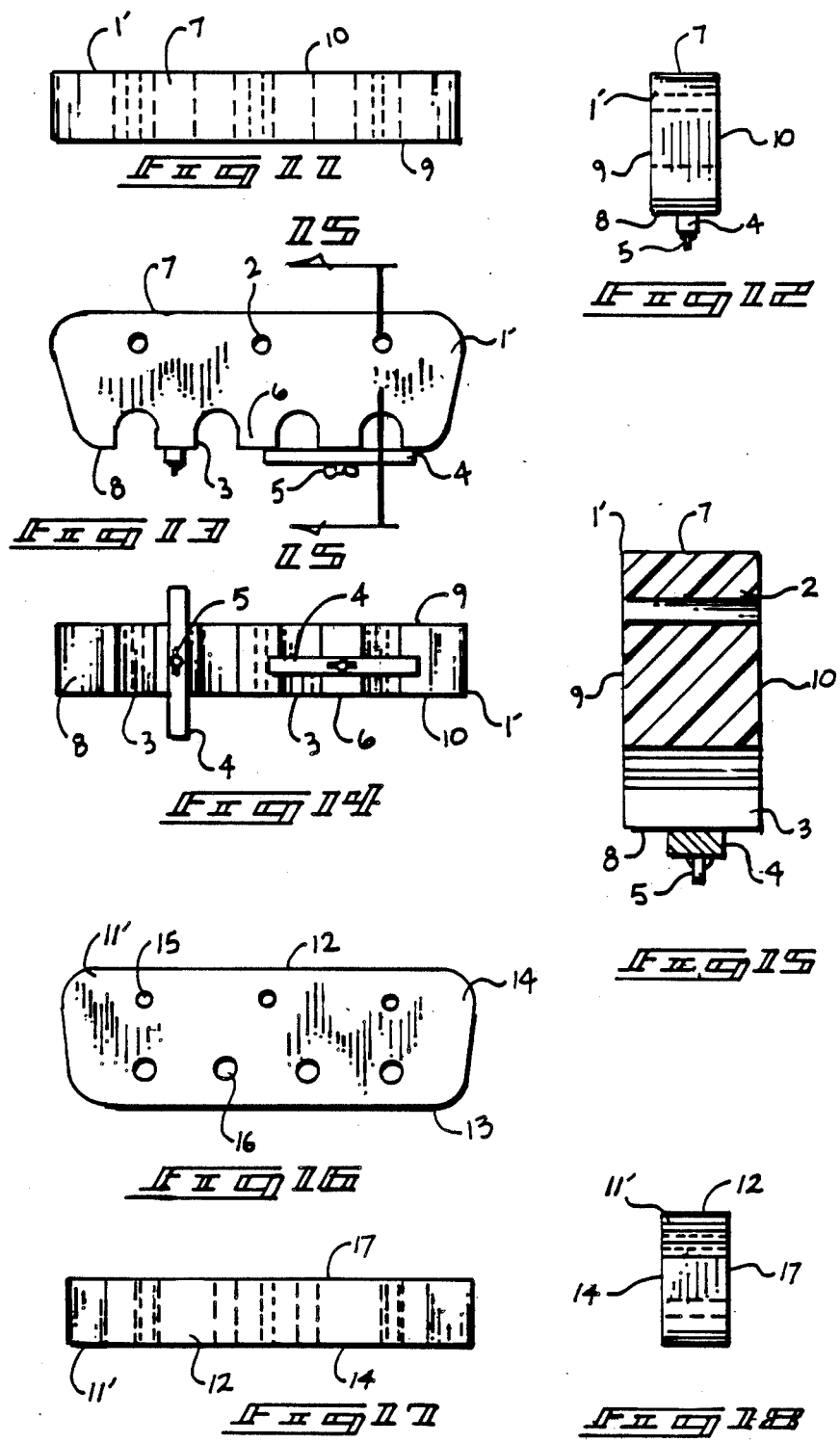

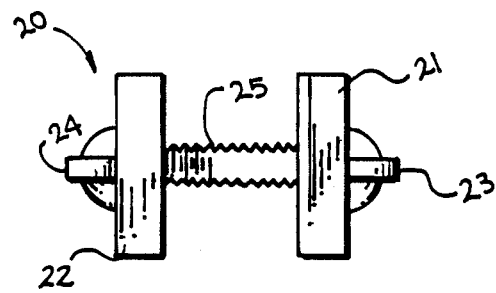
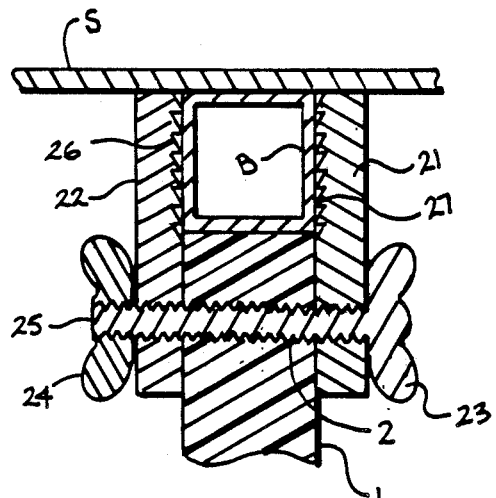
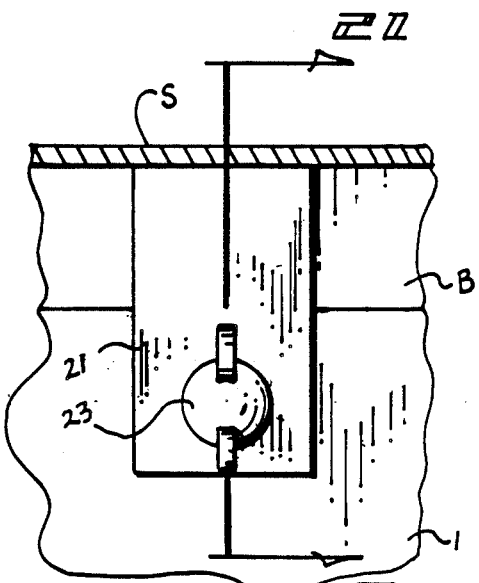
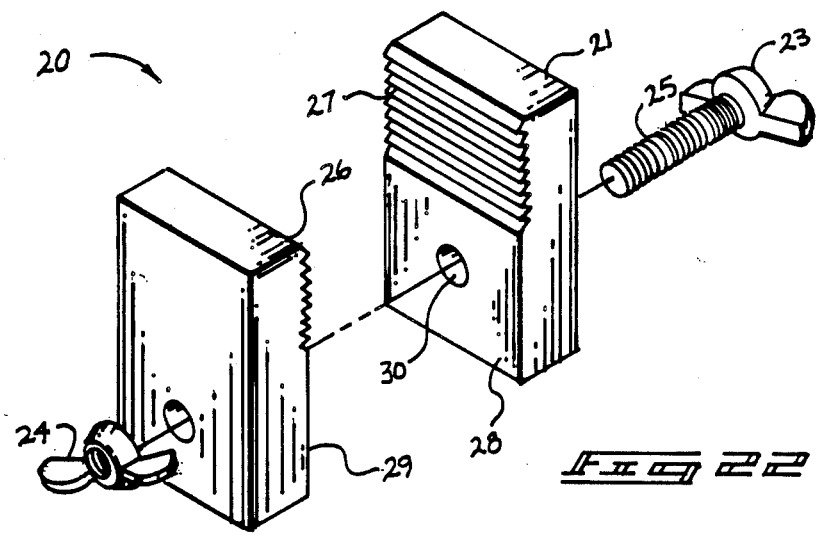

FISHING ROD HOLDER

BACKGROUND OF THE INVENTION

1. Field of the Invention

The present invention relates to fishing rod holders, and more particularly pertains to a new and improved fishing rod holder for securing a plurality of fishing rods in a protected storage location within a camper shell or cap of a pickup truck. Many fishermen utilize pickup trucks which are provided with a camper shell or cap. Conventionally, fishermen travelling to an intended fishing spot, or to a marina or dock, lay the fishing rods in the bed of the truck. This frequently causes the fishing rods and the attached fishing lines to become entangled resulting in a time consuming and tedious operation of separating the fishing rods from one another. Additionally, this allows the fishing rod and the attached reel to bounce around on the truck bed, frequently resulting in damage to the fishing rod and reel. Fishermen who fish from boats in the ocean or in lakes often carry a large number of fishing rods, and this creates aggravated transportation and storage problems. Additional fishing gear and other equipment must be carried in the pickup truck bed, along with the fishing rods. The presence of the fishing rods on the truck bed consumes storage space needed for this additional equipment. In order to overcome these problems, the present invention provides a fishing rod holding system which enables a plurality of fishing rods to be secured to the ceiling of a pickup truck cap or camper shell.

2. Description of the Prior Art

Various types of fishing rod holders are known in the prior art. A typical example of such a fishing rod holder is to be found in U.S. Pat. No. 2,554,650, which issued to W. Waite on May 29, 1951. This patent discloses a fishing rod carrier which is secured on the exterior roof of a vehicle. Spring straps having hooks for engagement with rain gutter portions of the vehicle are utilized to retain the carrier on the roof of the vehicle. A pair of spaced supports extend in parallel relation on the roof of the vehicle and fishing rods have a handle portion mounted in one support and a tip portion secured to the other support. U.S. Pat. No. 2,721,680, which issued to P. Steckman on Oct. 25, 1955, discloses a fishing rod holder which utilizes a pair of generally parallel spaced supports which are secured by resilient U-shaped clamps which engage back portions of front and rear seats within a motor vehicle. Fishing rods are supported between these spaced supports. U.S. Pat. No. 3,291,427, which issued to E. Hutchings on Dec. 13, 1966, discloses a fishing rod holder which utilizes a pair of spaced supports adapted to be secured in parallel relation to the gunwale of a boat. U.S. Pat. No. 4,424,907, which issued to B. Robb on Jan. 10, 1984, discloses a fold down storage rack for permitting the storage of fishing rods across a ceiling which includes first and second rack supports and a pair of parallel rods pivoted to one rack support and including an end member between the rods. The second rack support is parallel to the first rack support and includes a holding bracket coupled thereto and movably engageable with the end member for holding the rack in a storage position substantially parallel with the ceiling, and disngageable to permit the storage rack to be pivoted away from the ceiling. U.S. Pat. No. 4,582,203, which issued to H. Davis on Apr. 15, 1986, discloses a fishing rod holder which utilizes two spaced supports which extend in parallel relation for holding a plurality of fishing rods. A first support is formed from metal tubing encased in a protective material to form two legs at each ends with a plurality of generally sinusoidally configured, U-shaped recesses between the legs, each recess adapted to hold the stem of respective fishing rod, and the second member formed from a substantially C-shaped portion of tubing in which one of two walls is cut to form a plurality of slots, each slot being adapted to hold the handle of a respective fishing rod.

While the above mentioned devices are suited for their intended usage, none of these devices disclose a fishing rod holder which utilizes two spaced supports for securing a plurality of fishing rods along the interior ceiling of a pickup truck cap or camper shell. Additionally, none of the aforesaid devices utilizes a generally rectangular support provided with a plurality of spaced U-shaped notches, with a pivotal clamp bar mounted between adjacent pairs of notches for securing a handle portion of a fishing rod in each notch. Inasmuch as the art is relatively crowded with respect to these various types of fishing rod holders, it can be appreciated that there is a continuing need for and interest in improvements to such fishing rod holders, and in this respect, the present invention addresses this need and interest.

SUMMARY OF THE INVENTION

In view of the foregoing disadvantages inherent in the known types of fishing rod holders now present in the prior art, the present invention provides an improved fishing rod holder. As such, the general purpose of the present invention, which will be described subsequently in greater detail, is to provide a new and improved fishing rod holder which has all the advantages of the prior art fishing rod holders and none of the disadvantages.

To attain this, representative embodiments of the concepts of the present invention are illustrated in the drawings and make use of a pair of supports. These supports are secured to transverse roof braces of the camper shell in parallel spaced relation. A first support has a generally rectangular configuration and is provided with a plurality of U-shaped notches for the reception of handle portions of a plurality of fishing rods. A pivotal clamp bar is mounted between each pair of adjacent notches and may be pivoted between opened and closed positions for securing a fishing rod handle within each notch. The pivotal clamp bar is retained in a closed position by tightening of a wing nut fastener. A plurality of spaced apertures are provided for the reception of threaded fasteners utilized to secure the first support to a roof cross brace of the camper shell. A second support also has a generally rectangular configuration and is provided with a series of spaced circular apertures for the reception of tip portions of a plurality of fishing rods. The second support has a second plurality of apertures for the reception of threaded fasteners utilized to secure the second support to a roof cross brace of a camper shell. A clamp is also disclosed which utilizes a pair of serrated jaw portions for engagement with the camper shell roof cross braces for mounting the fishing rod holder without necessitating the drilling of any holes. In use, the first and second supports are mounted in parallel spaced relation along the interior ceiling of the camper shell. The fishing rods are supported between the first and second supports and extend along the ceiling of the camper shell, out of the way and in a secure, safe protected storage location.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod holder which has all the advantages of the prior art fishing rod holders and none of the disadvantages.

It is another object of the present invention to provide a new and improved fishing rod holder which may be easily and efficiently manufactured and marketed.

It is a further object of the present invention to provide a new and improved fishing rod holder which is of a durable and reliable construction.

An even further object of the present invention is to provide a new and improved fishing rod holder which is susceptible of a low cost of manufacture with regard to both materials and labor, and which accordingly is then susceptible of low prices of sale to the consuming public, thereby making such fishing rod holders economically available to the buying public.

Still yet another object of the present invention is to provide a new and improved fishing rod holder which provides in the apparatuses and methods of the prior art some of the advantages thereof, while simultaneously overcoming some of the disadvantages normally associated therewith.

Still another object of the present invention is to provide a new and improved fishing rod holder which enables a plurality of fishing rods to be stored and transported in a protected location along the interior ceiling of a pickup truck cap or camper shell.

Yet another object of the present invention is to provide a new and improved fishing rod holder which allows a plurality of fishing rods to be transported within a pickup truck without consuming storage space required for additional fishing gear.

Even still another object of the present invention is to provide a new and improved fishing rod holder which utilizes a pair of generally rectangular spaced supports, with one support provided a plurality of U-shaped notches for the reception of handle portions of a plurality of fishing rods, and having a pivotal clamp bar mounted between adjacent pairs of notches for securing a fishing rod handle portion in each notch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of a first support member utilized in the fishing rod holder of the present invention.

FIG. 2 is a front view of the first support member.

FIG. 3 is a bottom view of the first support member.

FIG. 4 is a front view of the second support member.

FIG. 5 is a top view of the second support member.

FIG. 6 is a plan view looking upwardly at the interior ceiling of a pickup truck cap or camper shell, with the first and second support members mounted in operative positions.

FIG. 7 is an end view of the first support member mounted in operative position to an interior ceiling portion of a pickup truck cap or camper shell.

FIG. 8 is a cross sectional view, taken along line 8—8 of FIG. 7, illustrating the first and second support members mounted in an operative position, within a pickup truck cap or camper shell.

FIG. 9 is an exploded perspective view illustrating the first support member.

FIG. 10 is an exploded perspective view illustrating the second support member.

FIG. 11 is top view illustrating a first support member adapted for use with holding four fishing rods.

FIG. 12 is an end view of the first suport member.

FIG. 13 is a front view of the first support member of FIG. 11.

FIG. 14 is a bottom view of the first support member of FIG. 13.

FIG. 15 is a cross sectional view, taken along line 15—15 of FIG. 13.

FIG. 16 is a front view of a second support member adapted for holding four fishing rods.

FIG. 17 is a top view of the second support member of FIG. 16.

FIG. 18 is a side view of the second support member of FIG. 17.

FIG. 19 is a top view of a clamp which may be utilized to secure the first and second support members to the transverse roof braces of a camper shell without requiring the drilling of any holes in the roof braces.

FIG. 20 is a front view of the first support member secured to a transverse roof brace of a cap or camper shell by the clamp assembly of FIG. 19.

FIG. 21 is a cross sectional view, taken along line 21—21 of FIG. 20, illustrating the first support member secured to the transverse roof brace by the clamp.

FIG. 22 is an exploded perspective view of the clamp assembly of FIG. 19.

DESCRIPTION OF THE PREFERRED EMBODIMENT

With reference now to the drawings, and in particular to FIG. 1 thereof, a new and improved fishing rod holder embodying the principles and concepts of the present invention will be described.

More specifically, it will be noted that the first embodiment of the invention includes a generally rectangular first support member 1 which has a planar top surface 7, a planar front surface 9 and a planar back surface 10.

As shown in FIG. 2, a plurality of circular apertures 2 are formed through the first support member 1. These apertures extend in spaced linear relation and are adapted to receive conventional threaded fasteners for securing the first support member 1 to a transverse cross brace of a pickup truck camper shell or cap. A plurality of U-shaped notches 3 are formed in a bottom edge 8 of the first support member 1. Each U-shaped notc 3 is separated from each adjacent U-shaped notch by a leg portion 6. In FIG. 2, the first support member 1 is illustrated with eight U-shaped notches for supporting handle portions of eight fishing rods. Adjacent pairs of U-shaped notches 3 are adapted to be closed by a pivotal clamp bar 4 which is secured to the leg portion 6 by a thumb screw 5. By placing the handle portion of a fishing rod in one of the U-shaped notches 3 and pivoting the associated clamp bar 4 to a closed position, the handle portion of the fishing rod will be secured within the notch 3.

In FIG. 3, a bottom view is provided which illustrates the bottom side 8 of the first support member 1. The clamping bar 4 at the left hand portion of FIG. 3 is illustrated in an open position, the next adjacent clamping bar 4 is illustrated in a semi-open position and the two right hand clamping bars 4 are illustrated in fully closed positions.

In FIG. 4, a second supporting member 11 of the fishing rod holder of the present invention is illustrated. The second support member 11 has a plurality of circular apertures 15 which extend in spaced linear relation and are adapted to receive conventional threaded fasteners for securing the second supporting member 11 to the transverse cross brace of a pickup truck camper shell or cap. The second supporting member 11 has a planar top surface 12, a planar bottom surface 13 and a planar front surface 14. The second support member 11 is provided with a second plurality of circular apertures 16 which extend in spaced linear relation for the reception of tip portions of fishing rods. In FIG. 4, the second support member 11 is provided with eight circular apertures 16 for the reception of tip portions of eight fishing rods.

In FIG. 5, a top view of the second support member 11 is provided, which illustrates opposed planar front 14 and back 17 surfaces thereof.

In FIG. 6, a bottom view is provided of the interior of a camper shell S with the first 1 and second 11 supporting members mounted in operative positions. The conventional form of camper shell or cap S is formed from an aluminum or plastic material and is provided with rectangular interior transverse cross braces B which extend across the interior ceiling portion C of the shell S. The first support member 1 is secured adjacent a rear portion of the pickup truck cap S to the transverse cross brace B by a plurality of bolts 18 and cooperating nuts 19. These conventional threaded fasteners extend through the spaced circular apertures 2 (FIG. 2) of the first support member 1. The second support member 11 is similarly secured by cooperating conventional threaded fasteners 18 and 19 which extends through the spaced apertures 15 (FIG. 4) of the second supporting member 11. In use, fishing rods are supported between the first 1 and second supporting members 11 and extend in parallel relation adjacent the interior ceiling of the cap S.

In FIG. 7, a rear end view is provided of the pickup truck camper shell or cap S. The first support member 1 is illustrated supporting handle portions R of eight fishing rods. As may now be readily understood, the tip portions of each of these fishing rods is received through one of the aligned circular apertures 16 (FIG. 4) of the second supporting member 11.

In FIG. 8, a cross sectional view illustrates the first 1 and second 11 supporting members secured within the pickup truck cap S.

As shown in FIG. 9, the first supporting member 1' may be formed in a reduced length for purposes of holding only four fishing rods. The salient constructional details of the first support member 1' remain as described with reference to FIGS. 1 through 3.

Similarly, the second supporting member 11' may be formed in a reduced length for purposes of holding four fishing rods. The salient constructional features of the second supporting member 11' remain as described with reference to FIGS. 4 and 5.

In FIG. 11, a top view of the reduced length first supporting member 1' is provided.

In FIG. 12, a side view of the reduced length first supporting member 1' is provided.

In FIG. 13, a front view of the first supporting member 1' for use with four fishing rods is provided.

In FIG. 14, a bottom view of the first supporting member 1' is depicted. The left hand clamp bar 4 is illustrated in an open position and the right hand clamp bar 4 is illustrated in a closed position for retaining fishing rod handle portions in the U-shaped notches 3.

In FIG. 15, a transverse cross sectional view taken along line 15—15 of FIG. 13 illustrates the reduced length first supporting member 1'.

FIGS. 16, 17 and 18 provide respectively, front, top and side views of the reduced length second supporting member 11'.

With reference now to FIG. 19, an alternative clamping mechanism 20 for purposes of securing the first 1 and second 11 supporting members to the pickup truck cap or shell is provided. The clamping mechanism 20 includes first 21 and second 22 jaw portions which are adapted to be secured in spaced parallel relation by a bolt 25. The bolt 25 is preferably provided with a wing head portion 23 and a wing nut 24 to allow convenient manual tightening without requiring any tools.

In FIG. 20, a partial front view of the first supporting member 1 is provided. The first clamp jaw 21 is received on one side of a transverse cross brace B of a pickup truck cap S and is secured to the second jaw member disposed on the opposite side of the brace B. The bolt 25 extends through one of the circular apertures 2 (FIG. 2) of the first supporting member 1.

As shown in the cross sectional view of FIG. 21, the first clamp jaw 21 has a serrated toothed portion 27 which frictionally engages a first side of the cross brace B. The second clamp jaw 22 has a similar serrated tooth portion 26 which also frictionally engages the transverse cross brace B. By manual tightening of the wing head 23 and wing nut 24, the clamp jaws 21 and 22 may be tightened into frictional engagement with the brace B, thus firmly retaining the first support member 1 in an operatively mounted position. As may be readily understood, the second supporting member 11 may be mounted in an analogous fashion.

FIG. 22 provides an exploded perspective view of the clamp assembly 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod holder for holding a plurality of fishing rods adjacent an interior ceiling of a pickup truck cap having a plurality of spaced transverse cross braces, comprising:

an elongated first support member;
a plurality of spaced apertures formed through said first support member;
first clamping means for securing said first support member to a pickup truck cap cross brace, said first clamping means including a pair of serrated jaws disposed on opposite sides of said first support member and a threaded fastener extending through said spaced apertures of said first support member and through said jaws for clamping said first support member to a pickup truck cap cross brace;
a plurality of spaced U-shaped notches formed in a bottom edge of said first support member;
a clamp bar pivotally mounted on said bottom edge of said first support member, between adjacent pairs of said U-shaped notches, opposite ends of said clamp bar movable to a position blocking said adjacent pair of U-shaped notches for selectively retaining a handle portion of a fishing rod in each of said notches;
a thumb screw pivotally mounting each of said clamp bars on said bottom edge of said first support member;
an elongated second support member;
a plurality of spaced apertures formed through said second support member;
second clamping means for securing said second support member to a pickup truck cap cross brace in spaced parallel relation with said first support member, said second clamping means including a pair of serrated jaws disposed on opposite sides of said second support member and a threaded fastener extending through said and through said jaws for clamping said second support member to a pickup truck cap cross brace second support member connecting said jaws;
a plurality of second spaced apertures formed through said second support member for receiving tip portions of fishing rods.

* * * * *